Sept. 18, 1945.  H. F. LEE  2,384,933
VARIABLE CAMBER AIRPLANE WINGS
Filed Aug. 21, 1941  2 Sheets-Sheet 2
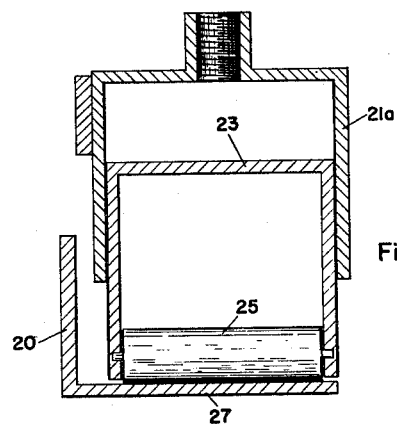
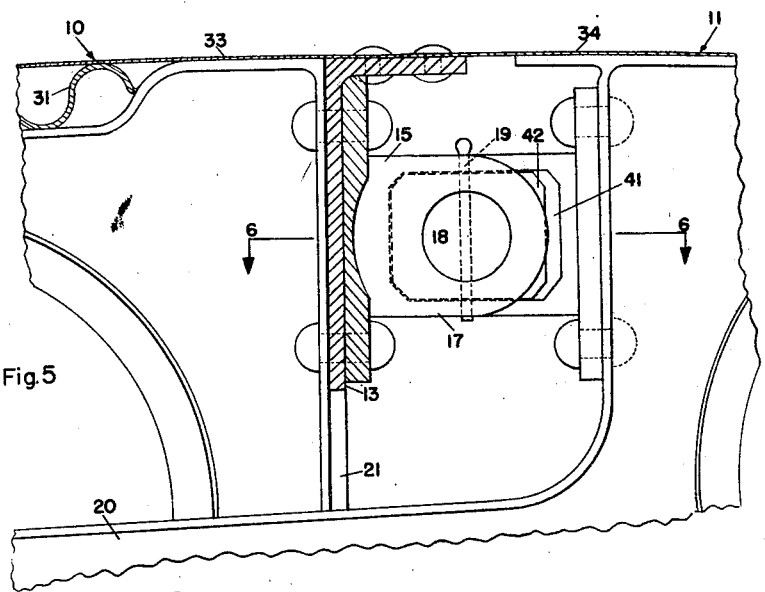
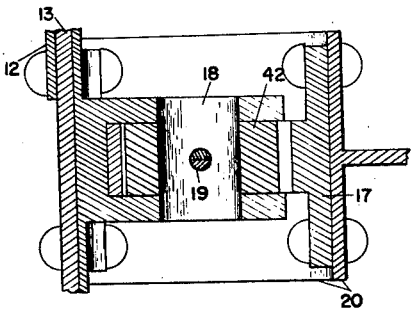
Inventor
*Harry F. Lee*
By  *G. J. Kramer*
Attorney Patented Sept. 18, 1945

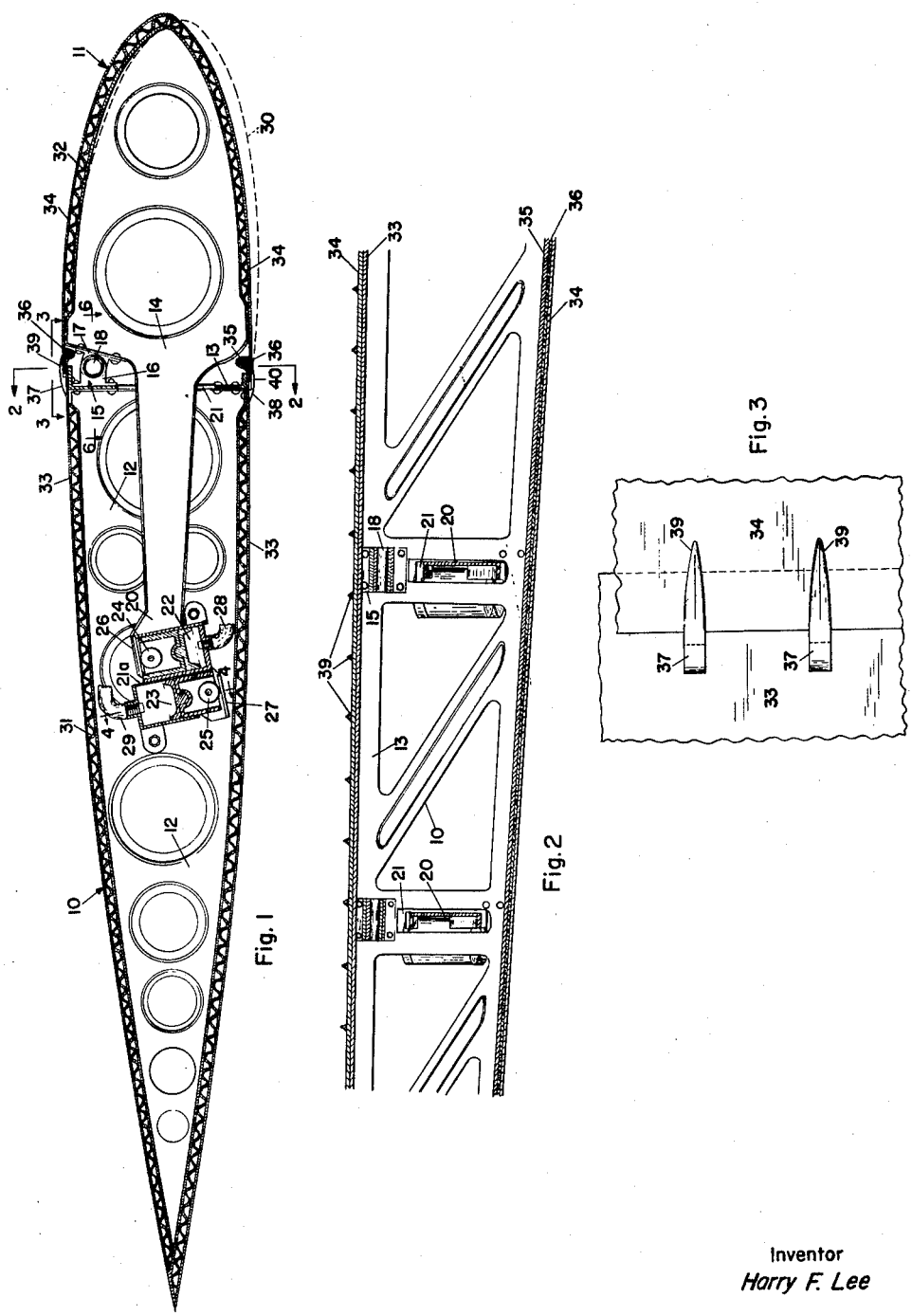

2,384,933

UNITED STATES PATENT OFFICE 2,384,933

VARIABLE CAMBER AIRPLANE WING

Harry F. Lee, Grand Junction, Colo.

Application August 21, 1941, Serial No. 407,758

6 Claims. (Cl. 244—44)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to me of any royalty thereon.

This invention relates to airplane wings, and more particularly to means for varying the camber thereof to provide a variable lifting capacity.

One of the objects of this invention is the provision of a wing of the type mentioned which is simple to construct, permitting the wing to be fabricated in two principal sections and completed by connecting the two sections together. Constructing a wing in this manner, namely in two sections, permits easy access to the interior of the wing throughout construction operations.

An embodiment of my invention is illustrated in the accompanying drawings, in which:

Figure 1 is a longitudinal section through the wing;

Figure 2 is a fragmentary section of the wing taken along the line 2—2 of Figure 1;

Figure 3 is a plan view of a part of the wing taken from the line 3—3 of Figure 1;

Figure 4 is a section along the line 4—4 of Figure 1;

Figure 5 is an enlarged view of a portion of Figure 1 about the hinge point of the two sections illustrating a modification of this invention; and Figure 6 is a section taken along the line 6—6 of Figure 5.

Referring with more particularity to Figures 1, 2, 3, and 4, in which like numerals designate like parts, the embodiment illustrated comprises main wing sections 10 and 11, the section 11 being forward of the section 10 and the boundary between the two sections being located generally at the point of greatest thickness of the aerofoil. However, other locations of the boundary may be used to meet any special conditions desired.

The rear section 10 of the wing is built around a framework of ribs 12, suitably braced, and a spar or beam 13 at the forward end of the ribs 12. The front section 11 of the wing is fabricated on a framework of suitably braced ribs 14.

The ribs 14 are hinged to the spar 13 by means of a knuckle joint designated generally by the numeral 15, vertically offset from the axis of the wing sections, one arm 16 of the knuckle joint being bracketed to the spar 13 and the other arm 17 being bracketed to the rib 14. The knuckle bolt 18 may be held in place by any suitable means such as a cotter pin 19.

Rib 14 is provided with a rearwardly extending arm 20 disposed through an aperture 21 of the spar 13 and terminating within the rear section 10 of the wing. In proximity to the rearward end of the arm 20, there is mounted on the rib 12 the housing 21 of a pair of hydraulic cylinders 22 and 23, each of said cylinders carrying a roller 24 and 25, respectively, adapted to contact an upper flange 26 and a lower flange 27, respectively, of the arm 20, whereby the arm 20 can be actuated up or down by introducing a hydraulic fluid under pressure to the piston 22 or 23, respectively. Hydraulic cables 28 and 29 are provided for this purpose and are connected to any suitable hydraulic control system (not shown) known in the art. The movement of the pistons 22 and 23 should be such as to permit an angular variation between the rear section 10 and the front section 11 of about three degrees, as indicated in Figure 1 by the outline of the front section 11 in broken lines 30. Over the framework of the ribs 12 of the rear section 5 and ribs 14 of the front section 11, the wing surfaces are applied and preferably comprise sheets of corrugated steel 31 and 32 secured to said ribs 12 and 14, respectively, over which corrugated sheets skin coverings 33 and 34, respectively, are secured, preferably by spot welding. The covering 33 of the rear section and the covering 34 of the front section overlap at the top and bottom of the wing, the covering 34 of the forward section being on the outside. The covering 33 on the rearward section extends within the forward section 11 of the wing and is provided with an inverted U-loop 35 forming a continuous channel throughout the length of the wing, within which is disposed a pad 36, such as felt or some other suitable padding material, preferably impregnated with a lubricant, such as a mixture of oil and graphite. These pads 36 provide an air seal between the two sections of the wing and at the same time lubricate the bearing surfaces between the two coverings 33 and 34. These pads also serve to dampen vibrations between the overlapping portions of the coverings 33 and 34.

In order to hold the covering 34 securely against the covering 33 at the point where they overlap, guides 37 and 38 are secured to the covering 33 adjacent the ends of the covering 34. These guides have projecting fingers 39 and 40, respectively, which hold the covering 34 in contact with the covering 33 and, at the same time, permit a relative movement of the coverings within the limits of operation of the two sections of the wing.

In Figures 5 and 6, a modification of my invention is illustrated which comprises the use of a hinged joint between the two sections of the wing which has a lost motion horizontally, whereby one of the lap joints between the coverings 33 and 34, either at the top or at the bottom of the wing, may be eliminated. The modification comprises substituting a rectangular opening 41 for the circular opening in the arm 17 of the knuckle joint 15. This rectangular opening is adapted to receive a block 42 slidably therein and secured to the bolt 18. By these means a degree of horizontal lost motion is effected which makes it necessary to provide only one lap joint between the two covering sections of the wing sections. It is preferable to eliminate the top lap joint, as illustrated. However, either one may be eliminated, if desired.

Having thus described my invention, I claim:

1. In an airplane wing, a rigid rear section, a rigid front section, a hinge for pivoting said front section to the forward end of said rear section, said hinge being disposed at a point vertically offset from the longitudinal axis of the wing, said hinge comprising a pair of brackets, one of said brackets having a horizontal slot, a block slidably disposed in said slot, a shaft secured to said block and rotatably engaged with the other bracket, a lever arm integral with the front section extending within the rear section, and means for actuating said arm so as to move said front section about the hinge.

2. An airplane wing comprising a rigid rear section, a rigid front section, a hinge within the wing structure for pivoting said front section to the forward end of the rear section, said sections extending throughout the length of the wing, said hinge comprising a slidable bearing for translation in fore and aft directions, an arm integral with the front section extending within the rear section, means for actuating said arm so as to move said front section about the hinge, said sections having each a skin covering, at least one of the ends of the covering of said front section overlapping the corresponding end of the covering of the rear section, guide means for holding the overlapped ends together in slidable relation, and a strip of padding between the overlapped portions of said coverings to dampen vibrations.

3. An airplane wing comprising a rigid rear section, a rigid front section, a hinge within the wing structure for pivoting said front section to the forward end of the rear section, said sections extending throughout the length of the wing, said hinge comprising a slidable bearing for translation in fore and aft directions, an arm integral with the front section extending within the rear section, means for actuating said arm so as to move said front section about the hinge, said sections having each a skin covering, at least one of the ends of the covering of said front section overlapping the corresponding end of the covering of the rear section, guide means for holding the overlapped ends together in slidable relation, and a strip of padding between the overlapped portions of said coverings to dampen vibrations, said padding being impregnated with a lubricant.

4. An airplane wing comprising a rigid front section, a rigid rear section separate from the front section, said sections extending substantially throughout the length of the wing, a hinge within the wing structure connecting said front section to and supporting it on said rear section, said hinge being vertically offset from the outer surfaces of the wing and having a slidable bearing for translation in fore and aft directions, means for rotating said front section relative to the rear section on said hinge and securing said sections in different relative positions of rotation, a skin covering on each of said sections, at least one end of the covering of said front section being overlapped on the corresponding end of the covering of the rear section, and a strip of padding between said overlapped ends to dampen vibrations.

5. An airplane wing comprising a rigid front section, a rigid rear section separate from the front section, said sections extending substantially throughout the length of the wing, a hinge within the wing structure connecting said front section to and supporting it on said rear section, said hinge being vertically offset from the outer surfaces of the wing and having a slidable bearing for translation in fore and aft directions, means for rotating said front section relative to the rear section on said hinge and securing said sections in different relative positions of rotation, a skin covering on each of said sections, at least one end of the covering of said front section being overlapped on the corresponding end of the covering of the rear section, and a strip of padding between said overlapped ends to dampen vibrations, said padding being impregnated with a lubricant.

6. An airplane wing comprising a rigid front section, a rigid rear section separate from the front section, said sections extending substantially throughout the length of the wing, a hinge within the wing structure connecting said front section to and supporting it on said rear section, said hinge being vertically offset from the outer surfaces of the wing and having a slidable bearing for translation in fore and aft directions, and means for rotating said front section relative to the rear section on said hinge and securing said sections in different relative positions of rotation.

HARRY F. LEE.